United States Patent

Miyoshi

[15] 3,657,632

[45] Apr. 18, 1972

[54] RECTIFYING DEVICE

[72] Inventor: Keisuke Miyoshi, Takatsuki, Japan

[73] Assignee: Matsushita Electric Industrial Co., Ltd., Osaka, Japan

[22] Filed: Oct. 22, 1970

[21] Appl. No.: 83,143

[30] Foreign Application Priority Data

| | | |
|---|---|---|
| Oct. 29, 1969 | Japan | 44/87045 |
| Oct. 29, 1969 | Japan | 44/87046 |
| Oct. 29, 1969 | Japan | 44/87047 |
| Oct. 29, 1969 | Japan | 44/87048 |
| Oct. 29, 1969 | Japan | 44/87049 |
| Dec. 9, 1969 | Japan | 44/99654 |
| Dec. 9, 1969 | Japan | 44/117749 |
| Dec. 9, 1969 | Japan | 44/117750 |
| Dec. 9, 1969 | Japan | 44/117751 |

[52] U.S. Cl. ................... 321/8 R, 315/1, 321/11, 321/27 R
[51] Int. Cl. ........................................................ H02m 7/00
[58] Field of Search .............. 315/1, 3; 317/234 W; 321/8, 321/11, 12, 27

[56] References Cited

UNITED STATES PATENTS

| | | | |
|---|---|---|---|
| 3,445,747 | 5/1969 | Laurent | 321/8 X |
| 3,123,760 | 3/1964 | Wouk et al. | 321/27 X |
| 3,128,421 | 4/1964 | Skellett | 321/27 X |
| 3,278,826 | 10/1966 | Walker | 321/8 |
| 3,373,336 | 3/1968 | Schillmann et al. | 321/27 X |
| 3,398,351 | 8/1968 | Kuntke | 321/27 X |
| 3,444,452 | 5/1969 | Janssen | 321/27 X |

*Primary Examiner*—William M. Shoop, Jr.
*Attorney*—Stevens, Davis, Miller & Mosher

[57] ABSTRACT

A rectifying device in which the high-voltage side coils of the secondary winding of an a-c voltage-generating transformer are placed opposite the a-c side rectifier elements of a stacked-type semiconductor rectifier and the low-voltage side coils thereof opposite the d-c side rectifier elements of said rectifier, thereby rendering almost uniform the reverse voltages across each of the rectifier elements by means of the distributed capacitance between the winding and the electrodes of the rectifier elements.

8 Claims, 14 Drawing Figures

RECTIFYING DEVICE

The present invention relates to a device for rectifying the high voltage produced by the flyback transformer of a television receiver.

An object of the present invention is to apply voltages uniformly to the individual elements of the rectifier so as to prevent damage thereto.

Another object of the present invention is to provide a rectifying device which can be used even when immersed in oil to improve its insulation.

Still another object of the present invention is to provide an efficient arrangement of rectifiers.

The above and other objects, features and advantages will be made apparent by the detailed description taken in conjunction with the accompanying drawings, in which.

Figure 9:
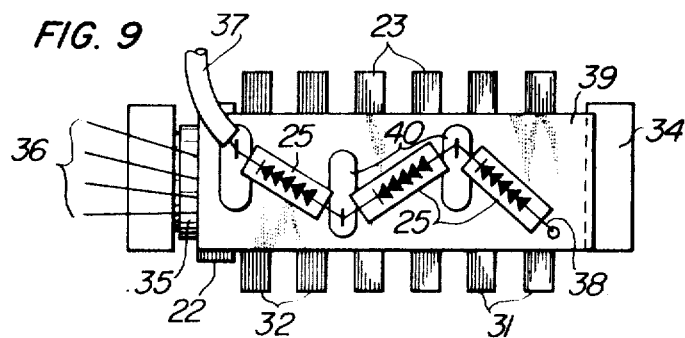
Figure 10:
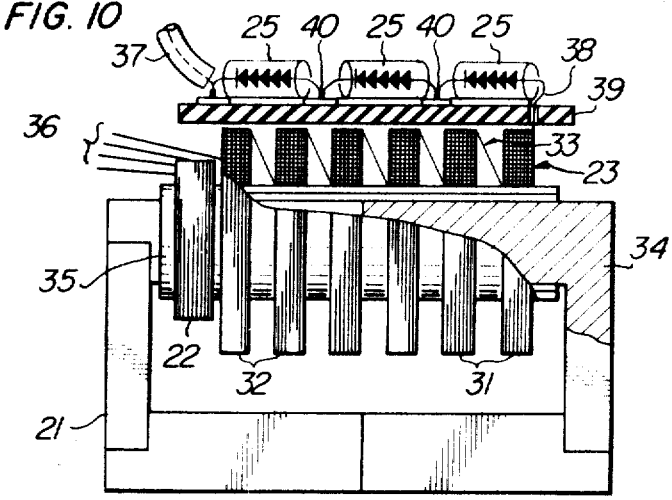
Figure 11:
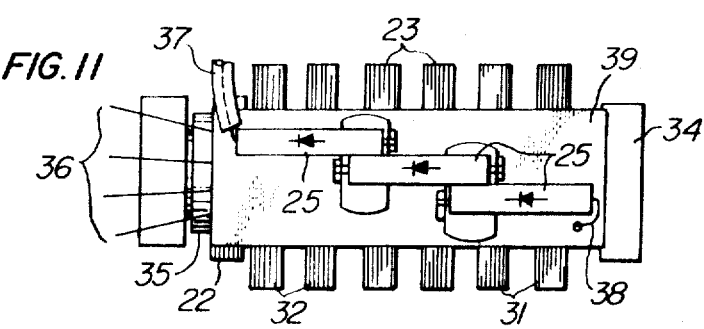
Figure 12:
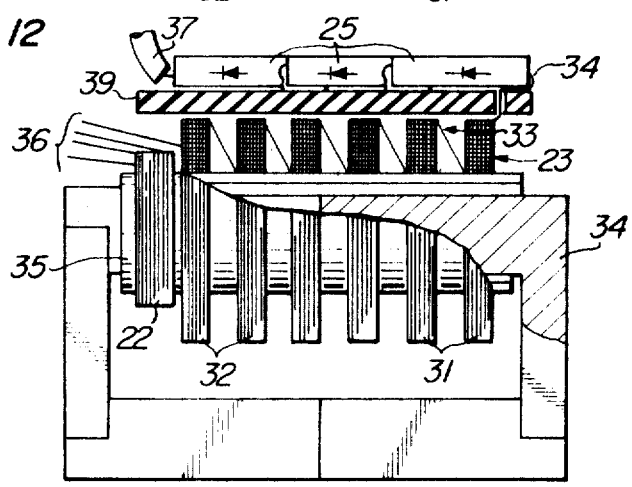
Figure 13:
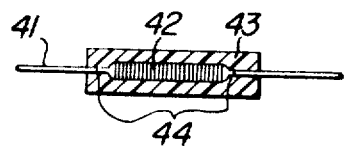
Figure 14:
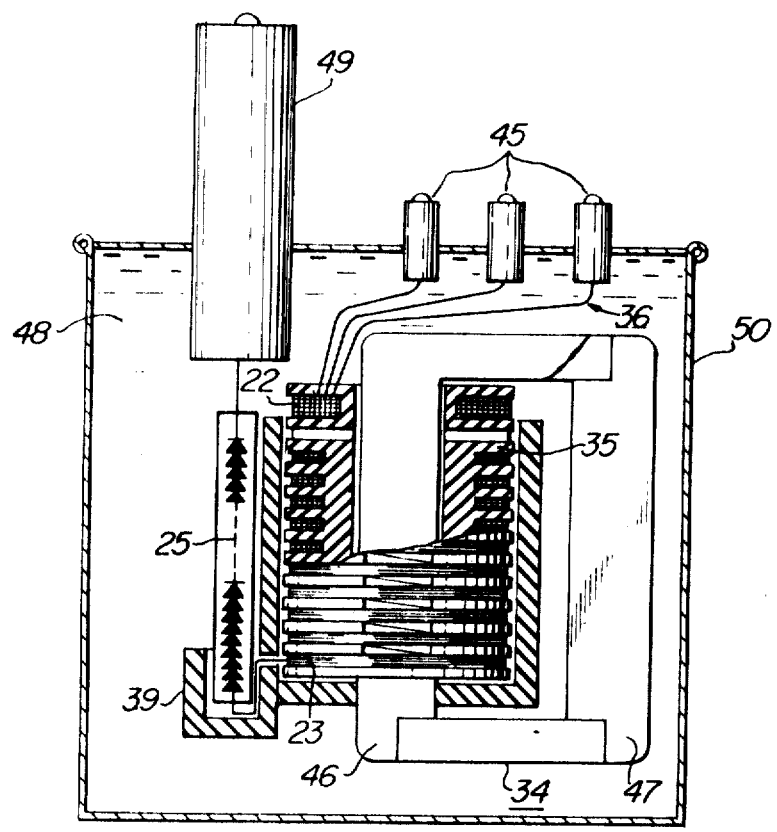

FIGS. 9 and 10 respectively show a plan and a partially exploded side view showing the essential parts of another embodiment of the present invention;

FIGS. 11 and 12 are respectively a plan and a partially exploded side view showing the essential parts of still another embodiment of the rectifying device according to the present invention;

FIG. 13 shows a plan of an element used with the rectifying device shown in FIGS. 11 and 12; and FIG. 14 is a partially exploded front view of a rectifying device showing still another embodiment of the present invention.

Figure 1:
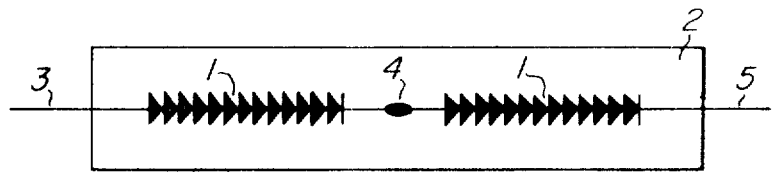
FIG. 1 is a diagram showing a model of the conventional rectifying device.

FIG. 1 shows a model of a conventional rectifying device which consists of a plurality of diode elements connected in series or stacked. Such a device is usually made of epoxide resin 2, the numerals 3, 5 and 4 showing a-c and d-c side terminals and an intermediate junction point respectively.

Figure 2:
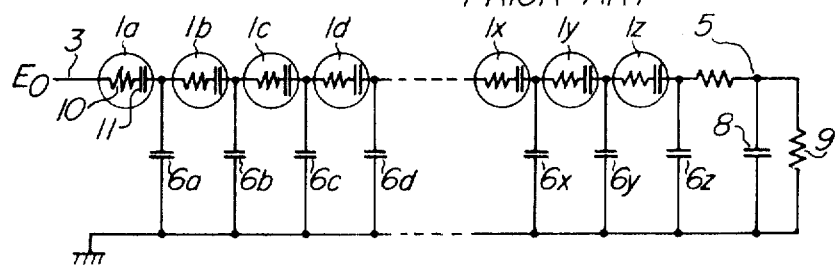
FIG. 2 is an equivalent circuit diagram of the device shown in FIG. 1.

An equivalent circuit of the rectifying device shown in FIG. 1 is illustrated in FIG. 2. The a-c and d-c terminals are shown by the same numerals as in FIG. 1, and each diode element 1 is represented by a resistor 10 and a capacitor 11. Numeral 6 designates the distributed capacitance disposed between ground and the diode element 1 or the junction point 4. The capacitor 8 and the resistor 9 represent a load.

When a semiconductor rectifying device in stacked form, for example, a selenium rectifier or silicon rectifier is used to rectify the pulses produced by the flyback transformer of a television receiver, elements at the a-c side are usually heated and damaged. This is due to the distributed capacitance 6, which is not negligible as compared with the inter-electrode capacitance 11.

Assume that an a-c voltage of a peak-to-peak value $E_o$ is applied to the a-c terminal 3 and that a-c voltages of peak-to-peak values $E_{6a}$ to $E_{6z}$ are applied to the distributed capacitances $6a$ to $6z$ respectively. Also, it is assumed that a d-c voltage $E_{DC}$ appears at the d-c terminal 5 after rectification. For convenience of explanation, the resistor 10 is neglected. Then, during the period when a forward current flows in each diode, the voltage impressed on each of the distributed capacitances $6a$ to $6z$ is shown as $E_{IK}$. The peak-to-peak a-c voltages $E_{6a}$ to $E_{6z}$ impressed on the distributed capacitances are sharply reduced towards the d-c terminal when the distributed capacitances $6a$ to $6z$ are comparatively high in value.

Figure 3:
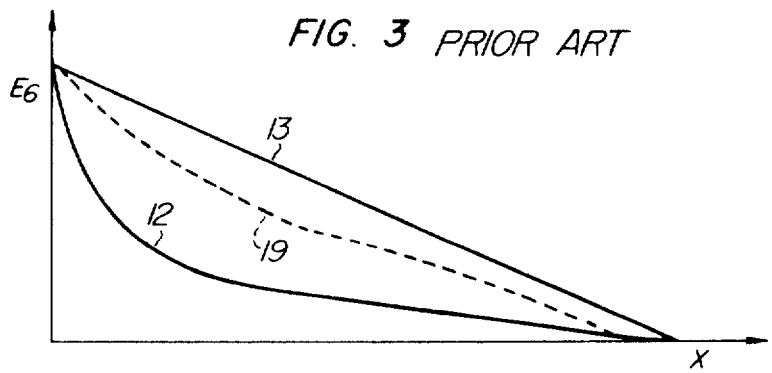
FIG. 3 is a graph showing the characteristics of the same device.

If one of the various points in the longitudinal direction of a diode is represented by X and the a-c peak-to-peak voltage impressed on the distributed capacitance at a given point X is represented by $E_{6x}$, the relationship between X and $E_{6x}$ can be shown in the curve 12 in FIG. 3. Accordingly, the voltages $E_o$–$E_{6a}$, $E_{6a}$–$E_{6b}$, $E_{6b}$–$E_{6c}$, . . . are applied to the diode elements $1a$, $1b$, $1c$, . . . respectively during the scanning period when a reverse voltage is impressed on each diode. Therefore, it is clear from FIG. 3 that a diode element arranged nearer to the a-c terminal 3 is impressed with a higher reverse voltage, and it sometimes happens that the diode element 1 near the a-c terminal 3 is finally broken down by the heat due to an increased reverse current. An ideal solution to this problem is to form an X–$E_{6x}$ relationship as shown in the straight line 13, in which case the imbalance in reverse voltage among the diode elements can be eliminated.

Figure 4:
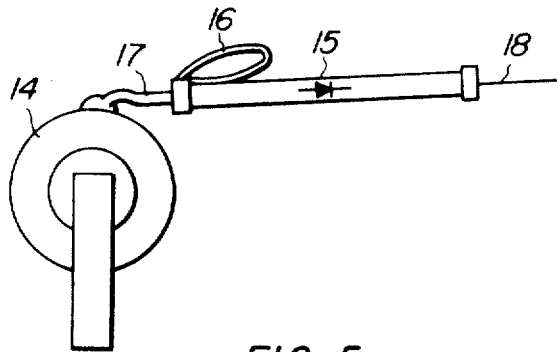
FIG. 4 is a front view of the conventional rectifying device.

The conventional rectifying device which is aimed at attaining this ideal is shown in FIG. 4, in which numeral 14 shows a flyback transformer, numeral 17 an a-c terminal, numeral 15 a rectifier, numeral 18 a d-c terminal and numeral 16 a lead wire for rendering uniform the reverse voltage impressed upon the diode elements.

Figure 5:
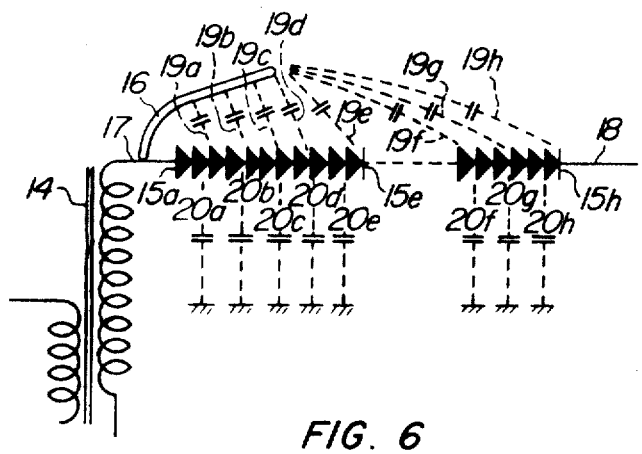
FIG. 5 is an equivalent circuit diagram of the device shown in FIG. 4.

The operating principle of the above-mentioned conventional device will be explained below with reference to FIG. 5. It will be understood from the above description that the peak-to-peak values of a-c voltages between the electrodes $15a$ to $15h$ and the earth are sharply reduced towards the d-c terminal 18 due to the distributed capacitances $20a$ to $20h$. One conventional method for correcting this situation is to provide a lead wire 16 at the a-c terminal 17 and also to additionally insert between the lead wire 16 and the diode elements the capacitors $19a$ to $19h$ respectively whose values are reduced towards the d-c terminal. Since one end of each distributed capacitance thus added is connected with the a-c terminal 17, the trend of sharp reduction as shown in the curve 12 in FIG. 3 can be improved to the curve, for example, shown in numeral 19. This method is used for a high voltage selenium rectifier of the conventional monochrome television receiver. The disadvantage of this method, however, is that the capacitances $19a$ to $19h$ inserted for correction are so inaccurate that the effectiveness of such a correction is limited. That is to say, correction is impossible when immersed in oil, in which case the dielectric constant $\epsilon$ and therefore the distributed capacitance is increased. In addition, there is the danger of a corona discharge occurring at the tip of the lead wire 16. The above disadvantages are not limited to television receivers in which pulses are generated, but are also apparent in other cases in which sine-wave voltages are applied.

The present invention obviates these disadvantages, and an embodiment thereof will be explained below with reference to FIG. 6. The rectifier 25 is placed opposite to the secondary winding 23 of the transformer 21 for generating an a-c voltage with the distance between the winding 23 and each of the diodes 25 sufficiently small compared with that between the diodes 25 and ground. This makes the distributed capacitance between each electrode of the rectifier elements and each part of the winding larger than that between each electrode of the diodes 25 and ground. The high-voltage side coils 31 of the winding 23 are placed opposite the a-c side element 29, and the low-voltage side coils 32 thereof opposite the d-c side element 30 of the rectifier 25, while connecting intermediate points by means of the distributed capacitances 24. Numeral 22 shows the primary winding of the transformer 21, and numeral 26 a cathode-ray tube or load. In this way, the rectifier can be prevented from being partially heated since the chain 27 as shown in FIG. 7 which is near the ideal voltage-distribution line 28 can be obtained instead of the curve 12 showing a sharp reduction in the a-c voltage $E_{6x}$ near the a-c terminal of the rectifier. It is this a-c voltage which causes the elements near the a-c terminal to be loaded with a reverse over voltage, leading to a final breakdown of the elements. If the coupling capacitance is made sufficiently great, the ideal line 28 is almost attained, and if it is small, correction up to intermediate points is possible. Also, since the a-c voltages between each portion of the winding 23 and the rectifier 25 are almost equal, it is enough if consideration is given only to the d-c breakdown voltage, whereby insulation is performed with relative ease. In addition, it is easy to fix the winding 23 and the rectifier 25 in place; that is, to maintain a constant value of the capacitor 24, enabling the uniform distribution of voltages among the rectifier elements without fail unlike the conventional method of correction.

Especially when the transformer 21 and rectifier 25 are enclosed in insulating oil, the capacitances between the electrodes of the rectifier elements and ground are increased. This is because the distance between the rectifier and ground is shortened in the insulating oil as the dielectric constant in an insulating oil is more than twice as high as that in air, and also the breakdown voltage of the insulating oil is about 10 times as high as that of air. As a result, the imbalance of reverse voltages among the rectifier elements is far greater in the insulating oil than in the air, which cannot be corrected well by conventional methods. This inconvenience is overcome by the device according to the present invention in which a very good balance is attained merely by fixing the rectifier opposite to the output winding, thereby preventing the diodes from being partially heated and finally damaged.

Figure 6:
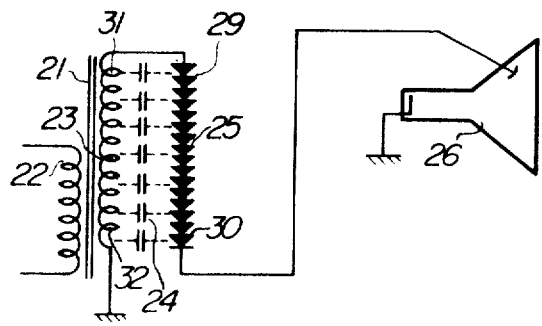
FIG. 6 is a circuit diagram showing an embodiment of the rectifying device according to the present invention.
Figure 7:
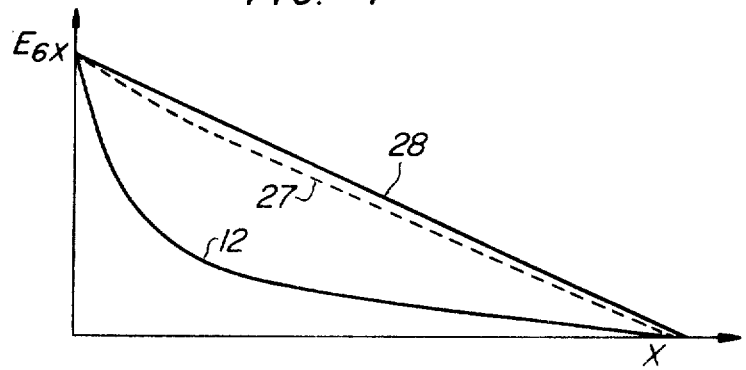
FIG. 7 is a graph showing the characteristics of the rectifying device shown in FIG. 6.
Figure 8:
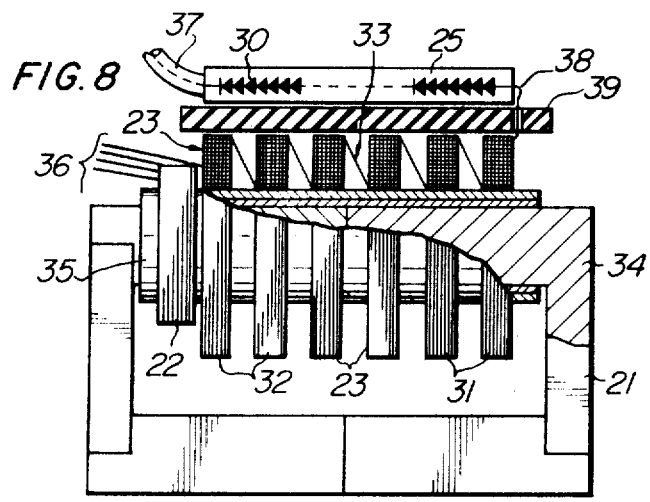
FIG. 8 is a partially exploded side view illustrating the construction of the rectifying device shown in FIG. 6.

An actual construction of the device shown in FIG. 6 is illustrated in FIG. 8, in which the same components are marked with the same numerals as those in FIG. 6. The winding 23 is split, numeral 33 showing a lead wire connecting each division of the winding together. Numeral 34 shows a core, numeral 35 a bobbin inserted into the core 34, numeral 36 lead wires for the primary winding 22 and the secondary winding 23, numeral 37 a lead wire connecting the d-c terminal of the rectifier 25 and the load, numeral 38 a lead wire for connecting the end of the winding 23 with the a-c terminal of the rectifier 25 and numeral 39 an insulating material interposed between the winding 23 and the rectifier 25. This insulating material whose dielectric constant is higher than that of, for example, air or oil causes the distributed capacitance 24 between the winding 23 and the diodes 25 to be increased. An insulating material with a high dielectric constant such as is used in this embodiment makes it possible to use the rectifying device not only in an insulating oil, but also in the case where the distance between the rectifier 25 and ground is small. Ideally, the winding 23 should be divided into as many portions as possible, making its total length almost equal to that of the rectifier 25. Even two or three divisions, however, serve the purpose well. To obtain a uniform distribution of reverse voltages applied to the rectifying elements, it is recommended that appropriate angles and distances be determined in connection with the winding 23 and rectifier 25 while measuring the temperature distribution among them.

The stacked-type semiconductor rectifier 25 used in the rectifying device as shown in FIG. 8 employs pieces of solder and silicon electrodes each about 0.2 mm in thickness which are stacked one on another in such manner that the heat conductivity in the longitudinal direction is greater than that in the perpendicular direction. Therefore, when a plurality of elements are molded into one, the end of the molding is comparatively low in temperature due to heat dissipation through the lead wires while the temperature at the central portion of the molding becomes disadvantageously high for conventional devices. This difficulty can be overcome by dividing the rectifier 25 into two or more portions with radiation pieces 40 connected to the junction points therebetween or intermediate taps, as shown in FIGS. 9 and 10. This can be accomplished by connecting separate metal pieces or alternatively enlarging the area of the terminals of the rectifying elements. Using these electrically conductive radiation pieces for a means in which the rectifier 25 and the radiation pieces are not generally placed opposite to the winding 23, the capacitances between the diodes and ground are increased, thereby approaching the curve 12 as shown in FIG. 7 to heat the a-c side elements 29. According to the present invention, however, the capacitance between the winding 23 and ground rather than that between the rectifier elements and ground is increased, whereby installation of the radiation pieces helps to achieve balance among the reverse voltages applied to the rectifier elements. As a result, heat is not only dissipated better, but less is generated in the a-c side elements 29, whereby the temperature of the rectifying device as a whole rises less during its operation, thus contributing to a longer life for the device. Especially when used in oil, an electric discharge from the radiation pieces 40 can be easily prevented and also the device can be cooled more effectively in oil, thereby improving the performance of the device.

Also, it sometimes happens that the requirements for the size of the transformer, the breakdown voltage of the rectifier and the number of elements used result in the length of the winding 23 not being matched with that of the rectifier 25. In particular, when the rectifier is too long compared with the winding 23, it is difficult to rely upon the capacitances 24 to achieve a balance among reverse voltages applied to the rectifying elements. In this case, voltages are properly distributed among the rectifier elements by arranging the rectifiers 25 in zigzag in the direction of the axis of the winding 23 as shown in FIGS. 9 and 10. It is needless to say that a similar effect can be achieved by slanting instead of zigzagging them. This also enables the transformer and rectifiers to be more compact.

One of the divided rectifier elements is shown in FIG. 13, in which numeral 41 shows a lead wire, numeral 42 rectifier elements stacked and connected with each other by means of solder or gold epoxide, and numeral 43 an outside covering molded by means of epoxy. In rendering uniform the voltages applied to the rectifier elements by means of distributed capacitances disposed between the winding 23 of the transformer and the opposite rectifier, the lead wire portion 44 which generally occupies some part of the whole length of the epoxy 43 performs no function. In order to make the winding 23 almost as long as the rectifier 25 in the longitudinal direction, the device as shown in FIGS. 11 and 12 has been developed. In this device each rectifier element is overlapped on the next one at an edge, so that the disadvantages due to the useless lead wire portion are eliminated.

An embodiment of the rectifying device immersed in oil is illustrated in FIG. 14. At almost the center of the housing 50 is a branch 46 of the core 34 on which the coils 23 are wound, the high-voltage rectifier 25 and the other branch 47 of the core 34 being disposed on both sides of the branch 46 respectively. The coils 23 which are divided into a plurality of members are wound on the bobbin 3 arranged on one side of the insulating material 39, and the high-voltage rectifier 25 is disposed along the other side of the coils 23 beyond the insulating material 39, the entire assembly being immersed in the oil 48. The rectifying device of this construction has the features mentioned below. By placing the bobbin 3 wound with the split coils 23 at the center of the housing 50, the distributed capacitance between the coils 23 and the housing 50 can be minimized. This almost obviates the defect that the "breathing" of the housing 50 due to variations in temperature and the resulting variations in capacitance between the coils 23 and the housing 50 causes variations in the waveform of the voltage to be rectified. Also, since the coils 23 are divided into a plurality of members for distributing them on the branch 46 of the core 34, the outside diameter of the coils 23 in its completed form can be made smaller, which makes possible the use of a magnetic material such as iron for the housing 50 without causing heat nor variations in the waveform of the current. Further, since the coils 23 are placed near the high-voltage rectifier 25 with the insulating material 39 interposed therebetween and the high-voltage and low- and d-c sides of the high-voltage rectifier 25 respectively, the heating of the a-c side elements due to the ground-side capacitance can be prevented even when a stacked-type high voltage semiconductor rectifier is employed. Furthermore, the arrangement as shown in the drawing makes maximum the distance between the high-voltage rectifier 25 and ground namely, the housing 50. In addition, according to this construction in which the coils 23, high-voltage rectifier 25 and the branch 47 of the core are disposed side by side very closely to one another, one side of the housing can be made sufficiently short compared with the longitudinal side thereof, whereby the surface area of the housing is increased and hence the heat is dissipated better, thereby giving the housing ample room to breathe in case of an expansion of the inside materials due to variations in temperature and also preventing the breakdown of the housing at a high temperature and the electric discharge at a low temperature. Also, in addition to the high-voltage output terminal 48 and low-voltage terminals 45 being usually disposed on the top of the housing for reasons of preventing oil leakage out of their joints with the housing and also for reasons of installation, the coils 22 with relatively many terminals are disposed on the top of the coils 23 in this embodiment to make the terminals 49 and 45 easily accessible and to facilitate working on the whole device. As mentioned earlier, the a-c side elements of the high-voltage rectifier 25 are heated when there is a ground-side capacitance. This may not be prevented even with the arrangement as shown in FIG. 14 due to the probable imbalance of such an arrangement, and it is important to maintain such elements at a low temperature to lengthen the life of the high-voltage rectifier. The results of our experiments show that when immersed in an insulating oil, the loss due to a flyback transformer used with a 19-inch color television receiver and a high voltage rectifier is a total of about 5 watts and the difference in temperature between the top and bottom of the housing is about 8° C. It follows therefore that by arranging at the lower part of housing 50 the a-c terminal of the easily-heated high-voltage rectifier 25, not only is the life of the rectifier lengthened, but also the convection of the insulating oil in the housing is improved.

What is claimed is:

1. A rectifying device comprising a rectifier with a plurality of series-connected semiconductor rectifier elements and a transformer for generating an a-c voltage connected with said rectifier, the high-a.c.-voltage side coils of the secondary winding of said transformer being disposed opposite the a-c side rectifier elements of said rectifier, the low-a.c.-voltage side coils of the secondary winding of said transformer being disposed opposite the d-c side rectifier elements of said rectifier, the high voltage output terminal of the secondary winding of said transformer being connected to one end of the series connection of said rectifiers, the opposite end of said series connection of rectifiers being the d-c output voltage terminal, the reverse voltages applied to each of said rectifier elements being rendered almost equal by means of distributed capacitance between said secondary winding and electrodes of said rectifier elements.

2. A rectifying device according to claim 1, in which the secondary winding of said transformer for generating an a-c voltage is divided into a plurality of members between the high-a.c.-voltage and low-a.c.-voltage sides thereof.

3. A rectifying device according to claim 1, in which an insulating material with a dielectric constant higher than that of the medium between said rectifier and ground is interposed between said rectifier and the secondary winding.

4. A rectifying device according to claim 1, in which the whole rectifying device is contained in a housing filled with oil.

5. A rectifying device according to claim 1, in which said rectifier consists of a plurality of stacked-type semiconductor elements, a radiation material being disposed at each joint of said stacked-type semiconductor elements.

6. A rectifying device according to claim 1, in which said rectifier elements are slanted from the direction of the axis of said secondary winding.

7. A rectifying device according to claim 1, in which said rectifier consists of a plurality of stacked-type semiconductor elements which are installed zigzag with respect to the axis of said secondary winding.

8. A rectifying device according to claim 1, in which said rectifier consists of a plurality of stacked-type semiconductor elements which are overlapped one on another at a small portion of the ends thereof as viewed from the side.

* * * * *